US008813065B2

(12) United States Patent
Zygmuntowicz et al.

(10) Patent No.: US 8,813,065 B2
(45) Date of Patent: Aug. 19, 2014

(54) MICROCLOUD PLATFORM DELIVERY SYSTEM

(75) Inventors: Ezra Zygmuntowicz, Portland, OR (US); Vadim Spivak, San Francisco, CA (US); Kent Skaar, Stow, MA (US); Derek Collison, Atherton, CA (US); Oleg Shaldybin, Mountain View, CA (US); Mark Lucovsky, Carpinteria, CA (US); Killian Murphy, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 243 days.

(21) Appl. No.: 13/157,480

(22) Filed: Jun. 10, 2011

(65) Prior Publication Data

US 2012/0030672 A1 Feb. 2, 2012

Related U.S. Application Data

(63) Continuation-in-part of application No. 13/094,538, filed on Apr. 26, 2011.

(60) Provisional application No. 61/327,915, filed on Apr. 26, 2010, provisional application No. 61/474,497, filed on Apr. 12, 2011.

(51) Int. Cl.
G06F 9/445 (2006.01)
G06F 9/44 (2006.01)

(52) U.S. Cl.
USPC ............ 717/174; 717/120; 717/176; 717/178

(58) Field of Classification Search
CPC ................ G06F 8/31; G06F 8/61; G06F 8/71
See application file for complete search history.

(56) References Cited

U.S. PATENT DOCUMENTS

| 6,609,128 | B1 | 8/2003 | Underwood |
| 6,976,093 | B2 | 12/2005 | Lara et al. |
| 7,275,244 | B1 | 9/2007 | Charles Bell et al. |
| 7,356,679 | B1 | 4/2008 | Le et al. |

(Continued)

FOREIGN PATENT DOCUMENTS

| EP | 2299360 A1 | 3/2011 |
| EP | 2381363 A2 | 10/2011 |
| JP | 2007-507046 A | 3/2007 |

OTHER PUBLICATIONS

Wei et al., Managing security of virtual machine images in a cloud environment, Nov. 2009, 6 pages.*

(Continued)

*Primary Examiner* — Thuy Dao

(57) ABSTRACT

A cloud computing environment with the ability to deploy a web application that has been developed using one of a plurality of application frameworks and is configured to execute within one of a plurality of runtime environments can be delivered as a self-contained virtual machine disk image configured to launch in a virtualization environment. Upon request (or alternatively, in a pre-processing phase), a cloud computing platform provider can compose a virtual machine disk image comprising the cloud computing environment. The virtual machine disk image may be attached to any virtual machine, whether running on a personal computing device such as a laptop or in an infrastructure-as-a-service service provider to provide a cloud computing environment that is automatically configured to receive and deploy a web application.

20 Claims, 8 Drawing Sheets

(56) References Cited

U.S. PATENT DOCUMENTS

| | | | |
|---|---|---|---|
| 7,370,322 B1 | 5/2008 | Matena et al. | |
| 7,577,722 B1* | 8/2009 | Khandekar et al. | 709/220 |
| 7,874,008 B2 | 1/2011 | Chang et al. | |
| 7,971,059 B2 | 6/2011 | Calman et al. | |
| 8,091,084 B1* | 1/2012 | Dobrovolskiy et al. | 717/174 |
| 8,108,912 B2 | 1/2012 | Ferris | |
| 8,176,094 B2 | 5/2012 | Friedman | |
| 8,176,559 B2 | 5/2012 | Mathur et al. | |
| 8,201,237 B1 | 6/2012 | Doane et al. | |
| 8,225,093 B2 | 7/2012 | Fok et al. | |
| 8,375,360 B2 | 2/2013 | I'Anson | |
| 8,407,689 B2 | 3/2013 | Dournov et al. | |
| 8,429,630 B2 | 4/2013 | Nickolov et al. | |
| 8,627,310 B2* | 1/2014 | Ashok et al. | 717/174 |
| 2002/0178254 A1 | 11/2002 | Brittenham et al. | |
| 2003/0061247 A1 | 3/2003 | Renaud | |
| 2005/0198303 A1* | 9/2005 | Knauerhase et al. | 709/227 |
| 2005/0289536 A1 | 12/2005 | Nayak et al. | |
| 2006/0037071 A1 | 2/2006 | Rao et al. | |
| 2006/0079356 A1 | 4/2006 | Kodama et al. | |
| 2006/0136897 A1 | 6/2006 | Laxminarayan et al. | |
| 2007/0058548 A1 | 3/2007 | Babonneau et al. | |
| 2007/0209035 A1* | 9/2007 | Sonderegger et al. | 718/1 |
| 2008/0163171 A1* | 7/2008 | Chess et al. | 717/120 |
| 2008/0209016 A1 | 8/2008 | Karve et al. | |
| 2009/0070752 A1* | 3/2009 | Alpern et al. | 717/148 |
| 2009/0070853 A1 | 3/2009 | Chung et al. | |
| 2009/0172781 A1* | 7/2009 | Masuoka et al. | 726/3 |
| 2009/0216970 A1* | 8/2009 | Basler et al. | 711/162 |
| 2010/0131590 A1 | 5/2010 | Coleman et al. | |
| 2010/0142447 A1 | 6/2010 | Schlicht et al. | |
| 2010/0251328 A1 | 9/2010 | Syed et al. | |
| 2010/0257605 A1 | 10/2010 | McLaughlin et al. | |
| 2010/0281166 A1 | 11/2010 | Buyya et al. | |
| 2010/0318649 A1 | 12/2010 | Moore et al. | |
| 2010/0333085 A1* | 12/2010 | Criddle et al. | 717/178 |
| 2011/0004916 A1 | 1/2011 | Schiffman et al. | |
| 2011/0055714 A1* | 3/2011 | Vemulapalli et al. | 715/739 |
| 2011/0061046 A1* | 3/2011 | Phillips | 717/176 |
| 2011/0107411 A1 | 5/2011 | McClain et al. | |
| 2011/0126197 A1 | 5/2011 | Larsen et al. | |
| 2011/0145836 A1 | 6/2011 | Wheeler et al. | |
| 2011/0153727 A1 | 6/2011 | Li | |
| 2011/0153824 A1 | 6/2011 | Chikando et al. | |
| 2011/0167469 A1 | 7/2011 | Letca et al. | |
| 2011/0214124 A1 | 9/2011 | Ferris et al. | |
| 2012/0084769 A1* | 4/2012 | Adi et al. | 717/174 |
| 2012/0102481 A1 | 4/2012 | Mani et al. | |

OTHER PUBLICATIONS

Hansen et al., Scalable virtual machine storage using local disks, Dec. 2010, 9 pages.*

Partial European Search Report dated Jul. 1, 2011, Application No. 11163533.0, filing date Apr. 21, 2011, 6 pages.

Goodwill, James: "Java Web Applications", O'Reilly, Mar. 15, 2001, pp. 1-3, XP002646828, Retrieved from the Internet: URL: http://onjava.com/lpt/a/671 [retrieved on Jun. 30, 2011].

Goodwill, James: "Deploying Web applications to Tomcat", O'Reilly, Apr. 19, 2001, pp. 1-11, XP002646829, Retrieved from the Internet: URL: http://oreilly.com/lpt/a/780 [retrieved on Jun. 30, 2011].

Laurent Tonon: "Tomcat Architecture Diagram", Apr. 26, 2011, p. 1, XP002646830, Retrieved from the Internet: URL: http://marakana.com/forums/tomcat/general/106.html [retrieved on Jul. 1, 2011].

International Search Report and Written Opinion dated Jun. 28, 2012, Application No. PCT/US2012/033356, filing date Apr. 12, 2012, 14 pages.

Changua Sun et al.: "Simplifying Service Deployment with Virtual Appliances", Services Computing, 2008. SCC '08. IEEE International Conference on, IEEE, Piscataway, NJ, USA, Jul. 7, 2008, pp. 265-272, XP031291269, ISBN: 978-0-7695-3283-7.

Leitner P, Application-Level Performance Monitoring of Cloud Services Based on the Complex Event Processing Paradigm, Dec. 2012, vol. 9, pp. 1-8.

* cited by examiner

MICROCLOUD PLATFORM DELIVERY SYSTEM

CROSS-REFERENCE TO RELATED APPLICATIONS

The present application is a continuation-in-part of U.S. patent application Ser. No. 13/094,538 filed on Apr. 26, 2011 and entitled "Droplet Execution Engine for Dynamic Server Application Deployment", which further claims the benefit of U.S. provisional patent application 61/327,915 filed on Apr. 26, 2010 and entitled "Droplet Execution Engine for Dynamic Server Application Deployment," each of which is hereby incorporated by reference. The present application also claims the benefit of U.S. provisional patent application 61/474,497 filed on Apr. 12, 2011 and entitled "Microcloud Platform Delivery System," which is hereby incorporated by reference. The present application is further related by subject matter to U.S. patent application Ser. No. 12/767,010 filed on Apr. 26, 2010 and entitled "Cloud Platform Architecture", U.S. patent application Ser. No. 13/094,500 filed on Apr. 26, 2011 and entitled "Policy Engine for Cloud Platform" and U.S. patent application Ser. No. 13/094,521 filed on Apr. 26, 2011 and entitled "Rapid Updating of Cloud Applications", each of which is hereby incorporated by reference.

BACKGROUND

"Platform-as-a-Service" (also commonly referred to as "PaaS") generally describes a suite of technologies provided by a service provider as an integrated solution that enables a web developer (or any other application developer) to build, deploy and manage the life cycle of a web application (or any other type of networked application). One primary component of PaaS is a "cloud-computing platform" which is a network (e.g., Internet, etc.) infrastructure run and maintained by the service provider upon which developed web applications may be deployed. By providing the hardware resources and software layers required to robustly run a web application, the cloud computing platform enables developers to focus on the development of the web application, itself, and leave the logistics of scalability and other computing and storage resource requirements (e.g., data storage, database access, processing power, facilities, power and bandwidth, etc.) to the cloud computing platform (e.g., at a cost charged by the service provider). A service provider may additionally provide a plug-in component to a traditional IDE (i.e., integrated development environment) that assists a developer who creates web applications using the IDE to properly structure, develop and test such applications in a manner that is compatible with the service provider's cloud computing platform. Once the developer completes a web application using the IDE, the plug-in component assists the developer in deploying the web application into the cloud computing platform.

However, due to complexities in providing flexible and scalable cloud computing platforms, PaaS is offered by few service providers. Current offerings of cloud computing platforms provide limited choices in the computer languages, application frameworks, runtime environments, available services and other technology options that may be selected to create a web application that can be launched in the cloud computing platform. For example, a cloud computing platform that only supports a runtime environment such as .NET® runtime environment made available by Microsoft would not be suitable for an enterprise with a technology development policy that requires development of web applications using an open source runtime environment such as the Apache Tomcat™ application server. Furthermore, software layers of current cloud computing platforms are inextricably coupled to the hardware resources (e.g., servers, storage, data centers, etc.) upon which they are built, making any enterprise requested customization, modification and/or portability of functionality prohibitive. Such inflexibility and limited choices make adoption of current PaaS more suitable for small start-up companies than for sophisticated enterprises that need to address issues such as governance, security, privacy and higher levels of control over web applications (service level requirements, scalability, fault tolerance etc.).

SUMMARY

One or more embodiments of the present invention provide a cloud computing environment for deployment of web applications that can be developed utilizing any choice of application framework (e.g., Ruby on Rails™, Spring™, etc.), any choice of runtime environment (e.g., Apache Tomcat™ application server, Microsoft .NET®, etc.) and any choice of programming language (e.g., Java, Ruby, Scala, Python, etc.). The cloud computing environment further decouples the software-based components of the cloud computing environment that provide web application deployment functionality from any hardware-based infrastructure platform upon which the software-based components might be built. As such, instances of the cloud computing environment can be launched on top of any type of hardware resource, from a single laptop to an enterprise-wide data center. The flexibility of such a cloud computing environment can lead to increased adoption at all levels, from the single developer to the entire enterprise.

One method, according to an embodiment, delivers the cloud computing environment as a self-contained virtual machine disk image configured to launch in a virtualization environment. According to the method, a cloud computing platform provider first receives a request for the cloud computing environment. In response to the request (or alternatively, in a pre-processing phase) the cloud computing platform provider composes a virtual machine disk image comprising (i) at least one installed server providing a service accessible to the web application (e.g., a database server such as a MySQL™ database), (ii) a runtime environment configured to deploy the web application (e.g., Apache Tomcat™ server), (iii) a controller component configured to receive the web application, bind the service to the web application and package the web application into a deployment package; (iv) a deployment agent component configured to receive the deployment package from the controller component and deploy the web application into the runtime environment, (v) a router component configured to route web application requests to the runtime environment, and (vi) an address and discovery layer component configured to propagate messages among the server, runtime environment, controller component, deployment agent component and router component. In response to the request, the cloud computing platform provider provides the virtual machine disk image. This virtual machine disk image may be attached to any virtual machine, whether running on a personal computing device such as a laptop or in an infrastructure-as-a-service service provider to provide a cloud computing environment that is automatically configured to receive and deploy a web application.

DETAILED DESCRIPTION

Figure 1A:
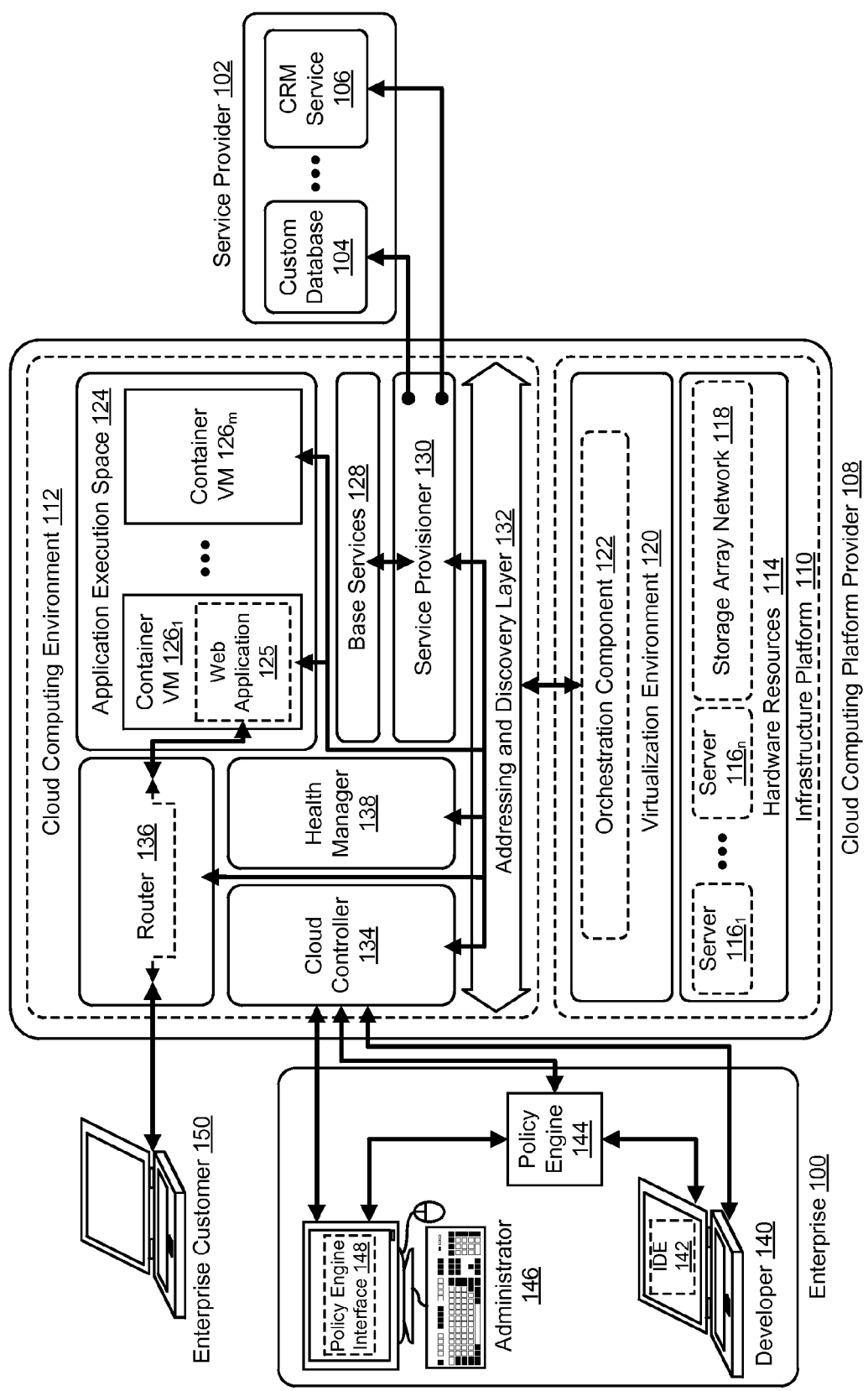
FIG. 1A depicts one embodiment of a cloud computing architecture for a service provider.

FIG. 1A depicts one embodiment of a cloud computing architecture for a service provider. An enterprise 100 desires to develop a web application to be deployed by service provider 102. For example, service provider 102 may have certain services (e.g., accessible, for example, via REST (Representational State Transfer) APIs (Application Programming Interface) or any other client-server communication protocol such as custom database 104 or CRM (Customer Relationship Management) service 106 (or any other service offered by service provider 102) that enterprise 100 desires to access through its developed web application. Service provider 102, in turn, utilizes resources provided by cloud computing platform provider 108 to provide a cloud computing environment in which enterprise 100 can deploy its web application.

Cloud computing platform provider 108 provides service provider 102 an infrastructure platform 110 upon which a cloud computing environment 112 may be executed. In the particular embodiment of FIG. 1A, infrastructure platform 110 comprises hardware resources 114, such as servers $116_1$ to $116_n$, and one or more storage array networks (SAN), such as SAN 118, which are configured in a manner to provide a virtualization environment 120 that supports the execution of a plurality of virtual machines across servers $116_1$ to $116_n$. As further detailed below, these virtual machines provide the various services and functions that make up cloud computing environment 112.

Virtualization environment 120 of FIG. 1A additionally includes an orchestration component 122 (e.g., implemented as a process running in a virtual machine in one embodiment) that monitors the infrastructure resource consumption levels and requirements of cloud computing environment 112 (e.g., by monitoring communications routed through addressing and discovery layer 132 as further detailed below) and provides additional infrastructure resources to cloud computing environment as needed or desired. For example, if cloud computing environment 112 requires additional virtual machines to host newly deployed web applications or to scale currently running web applications to support peak demands, orchestration component 122 can initiate and manage the instantiation of virtual machines on servers $116_1$ to $116_n$ to support such needs. In one example implementation of an embodiment similar to that of FIG. 1A, virtualization environment 120 may be implemented by running VMware ESX™ based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein).

In the embodiment of FIG. 1A, cloud computing environment 112 supports an application execution space 124 that comprises a plurality of virtual machines (referred to as container VMs $126_1$ to $126_m$) instantiated to host deployed web applications. For example, the deployment by enterprise 100 of a web application 125 on the cloud computing platform of service provider 102 results in the hosting of web application 125 in container VM $126_1$ of application execution space 124 at cloud computing platform provider 108.

Figure 2A:
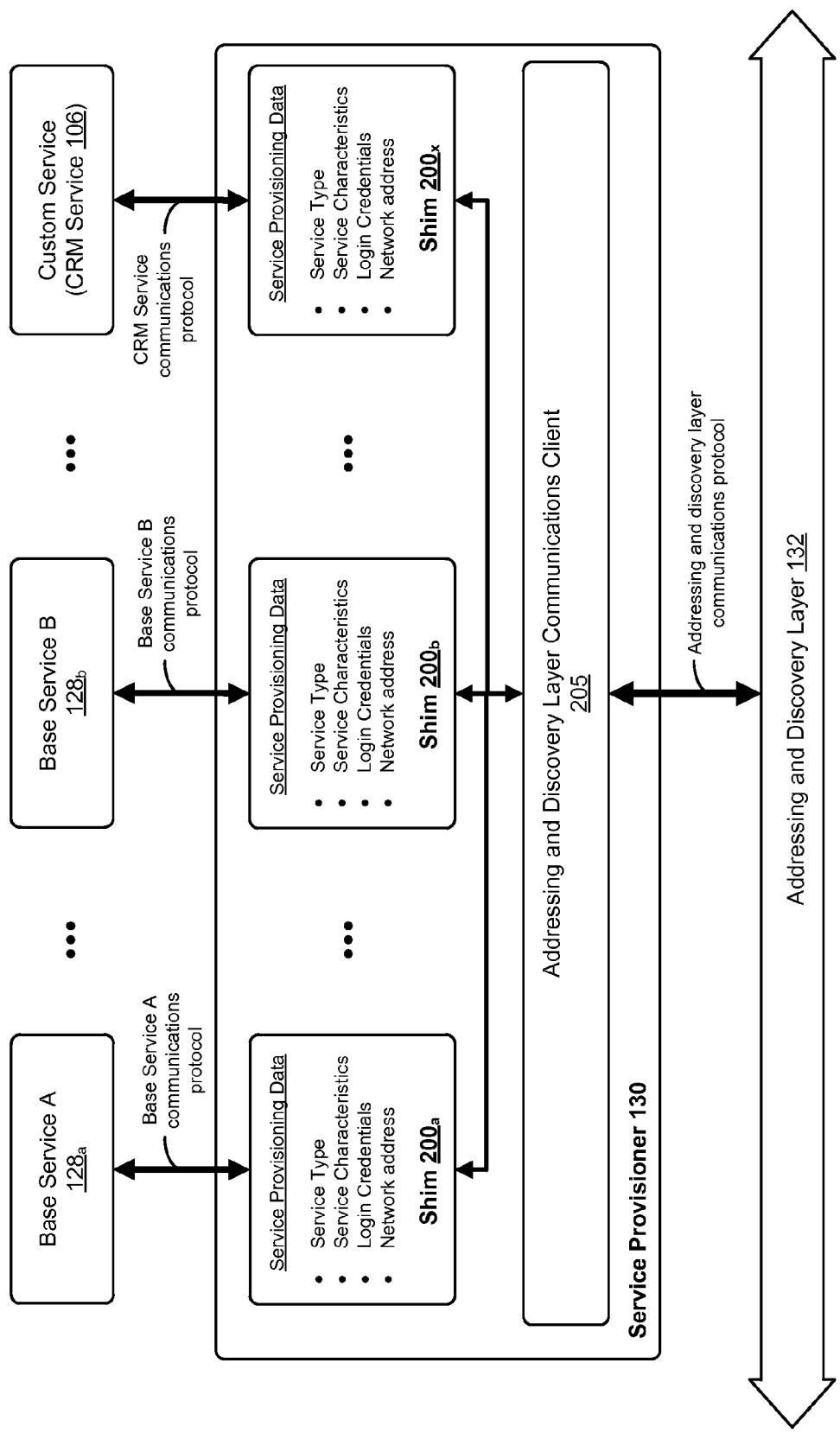
FIG. 2A depicts a component architecture for a service provisioner of a cloud computing environment.

Web application 125 can access a set of base services 128 (e.g., run in one or more virtual machines) provided by cloud computing environment 112 as well as third-party services such as those that may be provided directly by service provider 102 (e.g., custom database 104, CRM service 106, etc.). For example, a relational database service (e.g., MySQL, etc.), monitoring service, background task scheduler, logging service, messaging service, memory object caching service and the like may comprise base services 128 in one embodiment. A service provisioner 130 (e.g., run in one or more virtual machines) serves as a communications intermediary between these available services (e.g., base services 128 and other third party provided services such as custom database 104 and CRM service 106) and other components of cloud computing environment 112 (e.g., cloud controller 134, health manager 138, router 136, container VMs $126_1$ to $126_m$, etc.) and assists with the task of provisioning or binding such available services to web applications during the web application deployment process. FIG. 2A depicts a component architecture for service provisioner 130 of cloud computing environment 112, according to one embodiment. In the embodiment of FIG. 2A, service provisioner 130 maintains a shim or similar stub component (sometimes also referred to as a "service gateway") for each service available in cloud computing environment 112 (see, e.g., shims $200_a$, $200_b$ and $200_x$, respectively, for base services $128_a$ and $128_b$, and CRM service 106). Each shim component itself maintains service provisioning data for its corresponding service, such as a description of the service type, service characteristics (e.g., multi-tenancy versus single tenancy, etc.), login credentials for the service (e.g., root username, password, etc.), network address and port number of the service, and the like. Each shim component is configured to communicate with its corresponding service utilizing an API or other similar communications protocol that is supported by such service. For example, in order to bind web application 125 to base service $128_a$ during deployment, service provisioner 130 may direct shim $200_a$ to log into base service $128_a$ and generate new credentials (e.g., a new username and password) specifically for web application 125 so that web application 125 can directly log into and access base service $128_a$ with such credentials during its execution. In certain embodiments, service provisioner 130 further comprises an addressing and discovery layer communications client 205 that enables service provisioner 130 to communicate with other components of cloud computing environment 112 through addressing and discovery layer 132. In an alternative embodiment, service provisioner 130 may communicate with other components of cloud computing environment 112 through HTTP (HyperText Transfer Protocol) or other network protocols rather than through addressing and discovery layer 132, for example, to eliminate any compatibility requirements of third party services such as customer database 104 and CRM service 106 to utilize communication protocols of addressing and discovery layer 132.

Figure 2B:
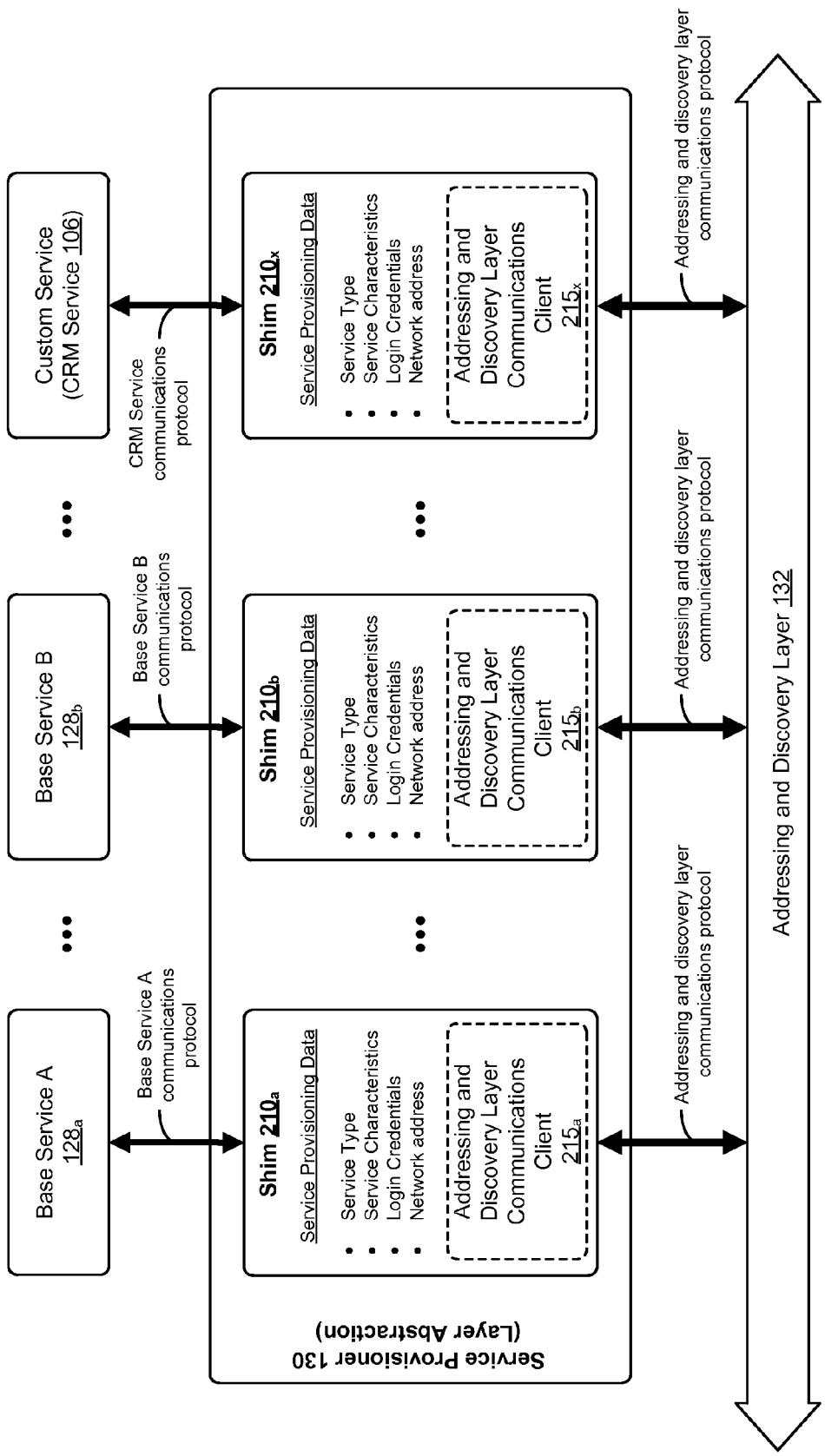
FIG. 2B depicts a service provisioner layer of a cloud computing environment.

It should be recognized that service provisioner 130 as depicted in FIG. 2A is only one embodiment of a communications intermediary between available services and other components of cloud computing environment 112 and that alternative embodiments may be implemented consistent with the teachings herein. For example, FIG. 2B depicts an alternative embodiment of service provisioner 130, as an abstraction layer of independently operating shim components. Each shim component (e.g., $210_a$ to $210_b$ to $210_x$) operates, for example, as an independent process and comprises its own addressing and discovery layer communications client (e.g., $215_a$, $215_b$ and $210_x$, respectively) to interact with addressing and discovery layer 132 (although, in alternative embodiments, such shim components may communicate with other components of cloud computing environment 112 through HTTP or other network protocols rather than utilizing such an address and discovery layer communications client 215). In an embodiment similar to that of FIG. 2B, shim components may be implemented in different locations, so long as they are able to effectively communicate with address and discovery layer 132. For example, shim $210_x$ for CRM service 106 may be implemented as a process running on a server at service provider 102 while shim components $210_a$ and $210_b$ for base services $128_a$ and $128_b$, respectively, may be implemented as processes running within allocated virtual machines at cloud computing service provider 108.

Returning to FIG. 1A, addressing and discovery layer 132 provides a common interface through which components of cloud computing environment 112, such as service provisioner 130, cloud controller 134, health manager 138, router 136 and container VMs $126_1$ to $126_m$ in application execution space 124, can communicate and receive notifications. For example, in one embodiment, service provisioner 130 may communicate through addressing and discovery layer 132 to broadcast the availability of services and to propagate service provisioning data for such services during deployment of web applications in cloud computing environment 112 (in other embodiments, service provisioner 130 may communicate with other components of cloud computing environment 112 through HTTP or other network protocols rather than address and discovery layer 132). Similarly, container VM $126_1$ may broadcast a notification through addressing and discovery layer 132 to indicate the successful deployment of web application 125 and to provide routing information (e.g., hostname and network address information, bound port number, etc.) for the successfully deployed web application 125. In one embodiment, addressing and discovery layer 132 is implemented as a message brokering service (e.g., running in one or more virtual machines) that defines a common protocol and message format through which components of cloud computing environment 112 can exchange messages and broadcast notifications and other information. In such an embodiment, the components of cloud computing environment 112 establish a connection with the message brokering service (e.g., also sometimes referred to as "subscribing" to the message brokering service), for example, through known authentication techniques (e.g., passwords, etc.) and, once connected to the message brokering service, can provide, receive and request messages, notifications and other similar information to and from other components that have also subscribed to the message brokering system. Examples of a message brokering service that may be used in an embodiment is RabbitMQ™ which is based upon the AMPQ (Advanced Message Queuing Protocol) open protocol standard or NATS™, an open source publish-subscribe messaging system. It should be recognized, however, that alternative interfaces and communication schemes may be implemented addressing and discovery layer 132 other than such a message brokering service.

Cloud controller 134 (e.g., run in one or more virtual machines) orchestrates the deployment process for web applications that are submitted to cloud computing environment 112 for deployment. Cloud controller 134 receives web applications submitted to cloud computing environment 112 and, as further detailed below, interacts with other components of cloud computing environment 112 to bind available services required by submitted web applications and package web applications for transmission to available container VMs (e.g., container VMs $126_1$ to $126_m$) for deployment. In the embodiment depicted in FIG. 1A, web applications, such as web application 125, received by cloud controller 134 may be developed by an application developer 140 in enterprise 100 using an integrated development environment (IDE) 142 installed on the developer's laptop or terminal IDE 142 includes an installed plug-in provided by service provider 102 that facilitates the development and submission of web application 125 to cloud computing environment 112. In order to provide enterprise 100 the ability to impose enterprise-wide rules on web applications (e.g., permitted accessible services, computing resource consumption limitations, etc.), service provider 102 may also provide to enterprise 100 a policy engine 144 to be run, for example, as a proxy server within enterprise 100. As depicted in the embodiment of FIG. 1A, policy engine 144 is situated in the communications path between the cloud controller 134 and entities that communicate with cloud computing environment 112 through cloud controller 134), such as application developer 140 or an administrator 146, as further discussed below. For example, policy engine 144 intercepts web applications submitted for deployment by developer 140 and reviews the requested requirements of such submitted web applications, prior to releasing them to cloud computing environment 112 for deployment. Administrator 146 in enterprise 100 is able to set policies for policy engine 144 as well as review analytics for web applications currently deployed in cloud computing environment 112 through a policy engine user interface 148 that communicates with policy engine 144 and can be accessed via a web browser or other client application. In one embodiment, policy engine 144 is further able to provide the same or similar functions as cloud controller 134 locally within enterprise 100. It should be recognized that policy engine 144 is an optional feature that may be provided by service provider 102 to enterprise 100 and that alternative embodiments or implementations may not utilize or include policy engine 144. For example, as depicted in FIG. 1A, application developer 140 and administrator 146 may communicate directly with cloud controller 134, without utilizing policy engine 144. Furthermore, it should be recognized that in alternative embodiments, policy engine 144 may be situated at any location within the communications path to cloud controller 134, for example, within service provider 102 or cloud platform provider 108 rather than enterprise 100, as is depicted in FIG. 1A. It should further be recognized that multiple policy engines 144, enforcing policies for different organizations, may be situated between in communications paths to cloud controller 134, for example, both within enterprise 100 and service provider 102. Cloud computing environment 134 further comprises a health manager 138 (e.g., run in one or more virtual machines) that tracks and maintains the "health" of cloud computing environment 112 by monitoring messages broadcast on addressing and discovery layer 132 by other components of cloud computing environment 112. For example, health manager 138 may notice the failure of an instance of a deployed web application and automatically broadcast a request to cloud controller 134 to re-start the web application. Similarly, health manager 138 may be further configured to itself initiate the re-starting of failed available services or other components of cloud computing environment 112 (e.g., cloud controller 134, service provisioner 130, router 136, etc.).

Once cloud controller 134 successfully orchestrates the deployment of web application 125 in container VM 126₁, an enterprise customer 150 can access web application 125, for example, through a web browser or any other appropriate client application residing on a computer laptop or other computer terminal. Router 136 (e.g., run in one or more virtual machines) receives the web browser's access request (e.g., a uniform resource locator or URL) and routes the request to container VM 126₁ which hosts web application 125. More generally, router 136 maintains mappings in internal routing tables between URLs and deployed web applications in order to properly route URL requests from customers to the appropriate container VMs hosting the requested web applications (as well as maintain load balancing among web application instances, etc.). These mappings are received by router 136 through address and discovery layer 132, as detailed further below, when a container VM successfully deploys a web application and thus broadcasts routing information (e.g., hostname, network address information, port number, etc.) for the web application through addressing and discovery layer 132.

Figure 1B:
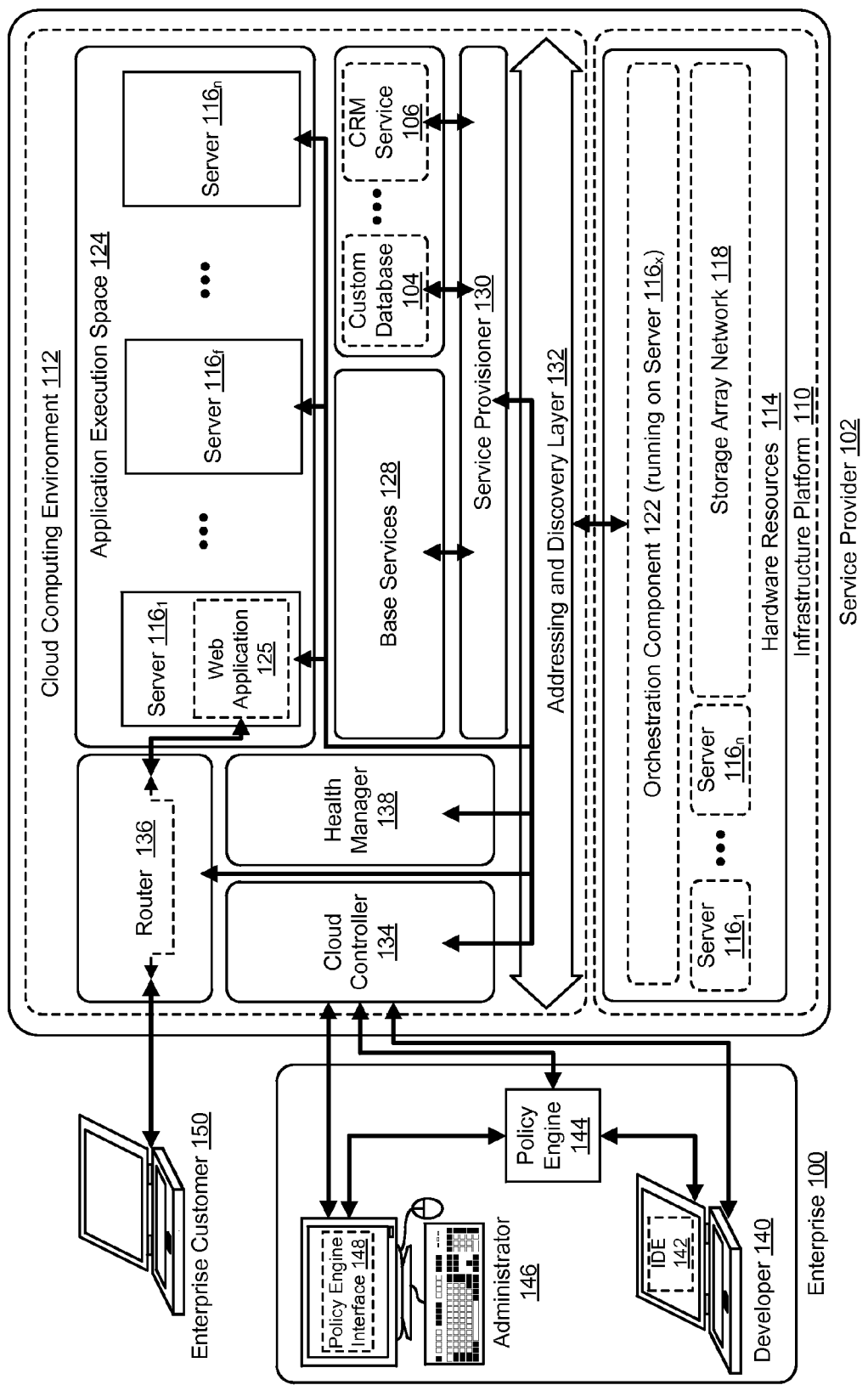
FIG. 1B depicts a second embodiment of a cloud computing architecture for a service provider.

It should be recognized that the embodiment of FIG. 1A is merely exemplary and that alternative cloud computing architectures may be implemented consistent with the teachings herein. For example, while FIG. 1A implements cloud computing environment 112 on an infrastructure platform 110 hosted by cloud computing platform provider 108, it should be recognized that cloud computing environment 112 may be implemented by entities other than cloud computing platform provider 108, on top of any type of hardware infrastructure. FIG. 1B depicts an alternative embodiment of a cloud computing architecture in which infrastructure platform 110 is provided by service provider 102 itself. Furthermore, unlike FIG. 1A, in which infrastructure platform 110 comprises a virtualization environment 120 in which components of cloud computing environment 112 are implemented as processes or daemons running in one or more virtual machines, the components of cloud computing environment 112 in FIG. 1B are run in a non-virtualized infrastructure platform 110, as processes or daemons directly on hardware resources 114, such as servers 116₁ to 116ₙ.

It should be recognized that embodiments may configure cloud computing environment 112 and infrastructure platform 110 in a loosely coupled manner with communication between computing environment 112 and infrastructure 110 only occurring through orchestration component 122 of infrastructure platform 110 which monitors hardware resource consumption by connecting to addressing and discovery layer 132). In such loosely coupled embodiments, it should be recognized that cloud computing environment 112 may be implemented on any infrastructure platform, including on a laptop or personal computer (e.g., in which case, each component of cloud computer environment 112 runs as a separate process or daemon on the laptop or personal computer).

Figure 3:
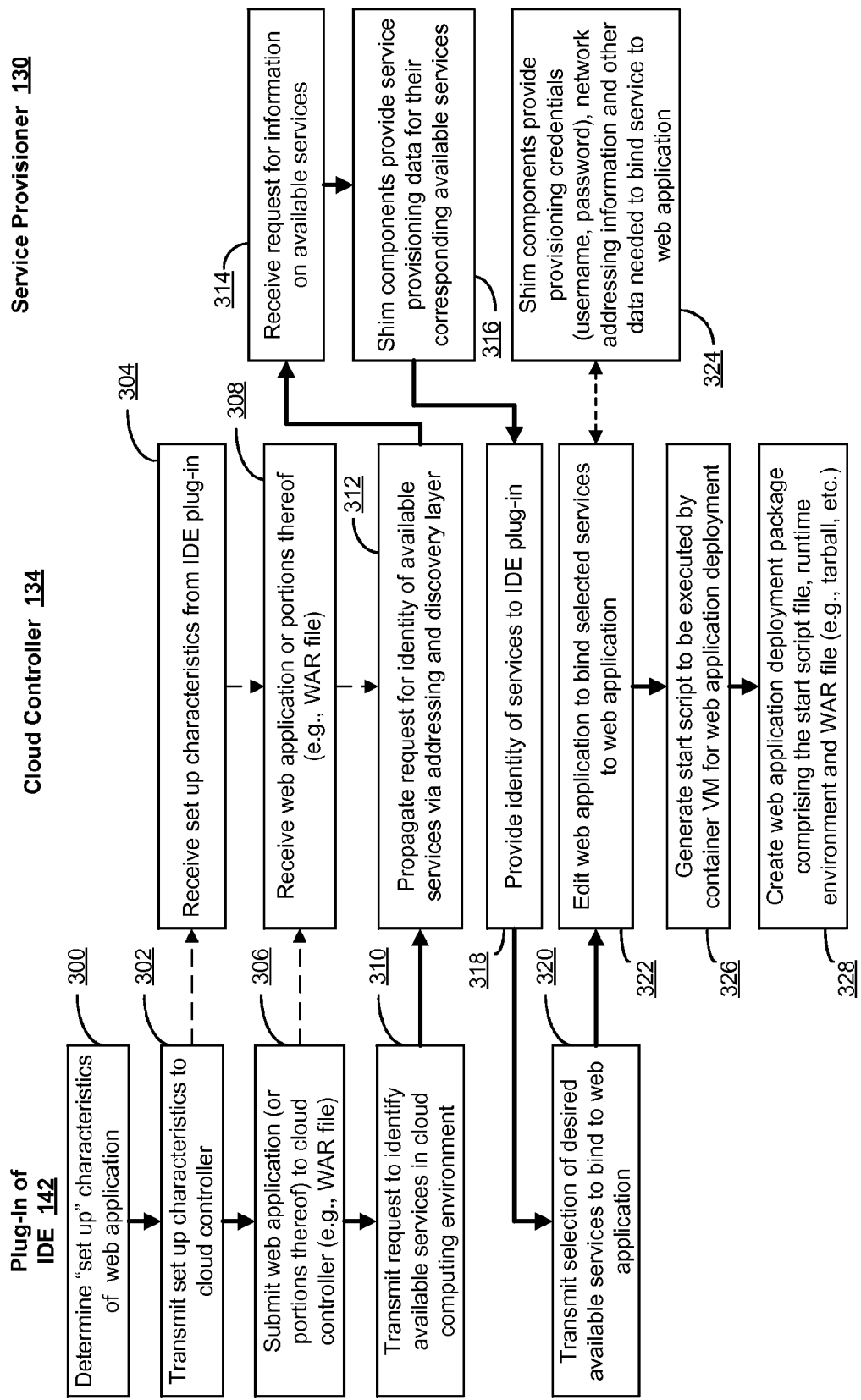
FIG. 3 depicts a flow diagram for preparing a web application for deployment by a cloud controller.

FIG. 3 depicts a flow diagram for preparing a web application for deployment by cloud controller 134. In step 300, the plug-in of IDE 142 analyzes the web application developed by developer 140 to determine "set-up" characteristics, such as the name of the web application and the application framework used to develop the web application (e.g., Spring™, Ruby On Rails™, etc.). For example, in one embodiment, the plug-in of IDE 142 determines the application framework used to develop the web application (e.g., Spring™, Ruby on Rails™, etc.) by analyzing the organizational structure of the various files (as well as possibly the contents of the files themselves) that make up the web application to identify characteristics that are specific to such application framework. In step 302, the IDE plug-in transmits the set-up characteristics to cloud controller 134 and cloud controller 134 receives such set-up characteristics in step 304. In step 306, the plug-in of IDE 142 further submits the web application (or portions thereof) to cloud controller 134, which, in turn, receives the submitted web application in step 308. In one embodiment, the submitted web application takes the form of a Java "WAR" (Web Application aRchive) file comprising dynamic (e.g., JavaServer Pages™, etc.) web pages, static web pages, Java servlets, Java classes, and other property, configuration and resources files that make up a Java web application. It should recognized, however, that a web application may be submitted by IDE plug-in as any other type of package that is compatible with the runtime environment (e.g., Apache Tomcat application server, etc.) in which the web application is to be deployed. For example, in an alternative embodiment, the submitted web application comprise a plurality of files, similar to those in a WAR file, organized into a tape archive file or a "tar" file (also referred to as a tarball). Furthermore, it should be recognized that, rather than submitting the web application itself, alternative embodiments may submit web application in step 306 by providing a reference to download or otherwise access the web application, for example, by providing a uniform resource locator ("URL"), Git repository or other similar reference to web application. In such embodiments, the step of receiving the web application in step 308 would thus utilize the provided reference to fetch the web application. In step 310, the IDE plug-in then transmits a request to cloud controller 134 to identify the available services in cloud computing environment 112. For example, if the web application requires access to a database, the IDE plug-in may specifically request a list of database services (e.g., MySQL™, Oracle®, etc.) that are available in cloud computer environment 112. Upon receiving such request, in step 312, cloud controller 134 propagates its own request for service provisioning data relating to available services onto addressing and discovery layer 132. Upon receipt by service provisioner 130 of this request in step 314, the shim components of service provisioner 130 (see, e.g., FIGS. 2A and 2B) provide service provisioning data for their corresponding services via addressing and discovery layer 132 in step 316.

Upon receipt of such service provisioning data, in step 318, cloud controller 134 is then able to transmit the identity of available services to IDE 142 as requested in step 310. Upon receipt of the identity of available services, in step 320, the IDE plug-in then determines and transmits a selection of desired available services to bind to the submitted web application. It should be recognized that such a selection process may, in certain embodiments, be automated, in accordance with pre-configured preferences set in the IDE, or may involve manual selection by developer 140 in other embodiments. Upon receipt of the selection of services, in step 322, cloud controller 134 begins a "staging process" to stage, or otherwise modify the contents of the WAR file (or other package) of the submitted web application to bind the selected services to the web application. In one embodiment, this staging process involves unpacking the WAR file or extracting its constituent directory structure and files, accordingly inserting new files and/or modifying existing files to bind the selected services, and repacking the WAR file (e.g., or otherwise creating a new WAR file that replaces the previous WAR file). For example, in step 324, cloud controller 134 and the shim components of service provisioner 130 for the selected services may exchange messages through addressing and discovery layer 132 (or via HTTP or other network protocols in other embodiments) to establish or otherwise obtain additional service provisioning data such as service login credentials (e.g., username/password combinations), hostname, network address and port number to access the service and any requisite software drivers/libraries that may be needed to enable the submitted web application to communicate with the services upon deployment. Cloud controller 134 is then able to incorporate such service provisioning data into the contents of the WAR file as part of the staging process. In one embodiment, set-up information identifying the application framework utilized to develop the submitted web application (i.e., that was received by cloud controller 134 in step 300) enables cloud controller 134 to properly insert service provisioning data into the contents of the WAR file to bind selected services based upon a data organization structure of the WAR file that is imposed by the application framework (e.g., inserting additional environmental variables, entries in configuration files, additional system parameters and the like reflecting, for example, the hostname, network address, port number and login credentials for the service, etc.). For example, if the application framework is the Spring framework, cloud controller 134 inserts service provisioning data into the contents of the WAR file in accordance with how a Spring framework developed web application organizes its data within the WAR file. Once the contents of the WAR file have been modified to bind selected services to the submitted web application, in step 326, cloud controller 134 generates a start script file that can be executed by a container VM to start a runtime environment and launch the submitted web application in the runtime environment. For example, if the WAR file is intended to be deployed in a runtime environment such as Apache Tomcat application server, the start script file may include commands to start Apache Tomcat and then start the servlet (or servlets) that comprises web application 125 (e.g., via a net start command, etc.). In an alternative embodiment, such binding as described in steps 322-324 may be deferred until the submitted web application is actually deployed, as further described below (when describing FIG. 5).

In step 328, cloud controller 134 then creates a web application deployment package that can be unpacked by any available container VM. In one embodiment, such a web application deployment package is a "tar" file (also referred to as a tarball) that includes the start script file, an instance of the runtime environment (e.g., Apache Tomcat, etc.) to be installed and started in a container VM, and the WAR file for web application 125 (e.g., embedded in an appropriate directory within the directory structure of the instance of the runtime environment). Alternative embodiments may include further optimizations to streamline the communication (and utilized network bandwidth) between the IDE plug-in at enterprise 100 and cloud controller 134. For example, in one embodiment, in step 302, IDE plug-in may include as part of the transmission of set-up characteristics, a "fingerprint" list of hash values (e.g., SHA-1 values, etc.) and file sizes for each file in the WAR file. Cloud controller 134, in turn, maintains its own table of fingerprint entries for hash value/file size pairs, with each entry associated with a stored file. Upon receipt of the list from the IDE plug-in, cloud controller 134 determines whether it already has any of the files in the WAR file by reviewing its table. In such manner, cloud controller 134 can specifically request only those files with associated hash values and file sizes for which cloud controller 134 does not have an entry in its table. Such an optimization can significantly reduce the amount of data transmitted by IDE plug-in to cloud controller 134. For example, if only a few lines of code have been changed in a single library file of an already uploaded web application, the foregoing fingerprinting process enables the IDE plug-in to transmit only the library file itself, rather than the entire WAR file. Similarly, since different web applications often share common application framework files, the foregoing fingerprinting process can further significantly reduce the uploading times for different web applications. It should be recognized that although an IDE (or IDE plug-in) is described in FIG. 3, alternative embodiments may initiate the flow in FIG. 3 performed by the IDE plug-in using other non-IDE environments. For example, developer 140 may interact with cloud controller 134 through a command line interface ("CLI"), other applications, or any other similar process or tool capable of initiating a network request (e.g., HTTP request) to communicate with cloud controller 134. Furthermore, it should be recognized that embodiments may include a policy engine 144 that intercepts communication between IDE plug-in (or CLI or other similar tool) and cloud controller 134, altering communications in order to adhere to set policies and/or performing steps on behalf of the IDE plug-in (e.g., selecting services in step 320 according to pre-defined policies, etc). It should also be recognized that functionalities described herein as provided in a plug-in IDE (or CLI or other application or tool) may be alternatively provided inside the cloud computing environment 112, for example, in cloud controller 134, in alternative embodiments. For example, in one alternative embodiment, determination of the application framework as part of the "set-up" characteristics in step 300 may be performed by cloud controller 134 upon its receipt of the web application.

Figure 4:
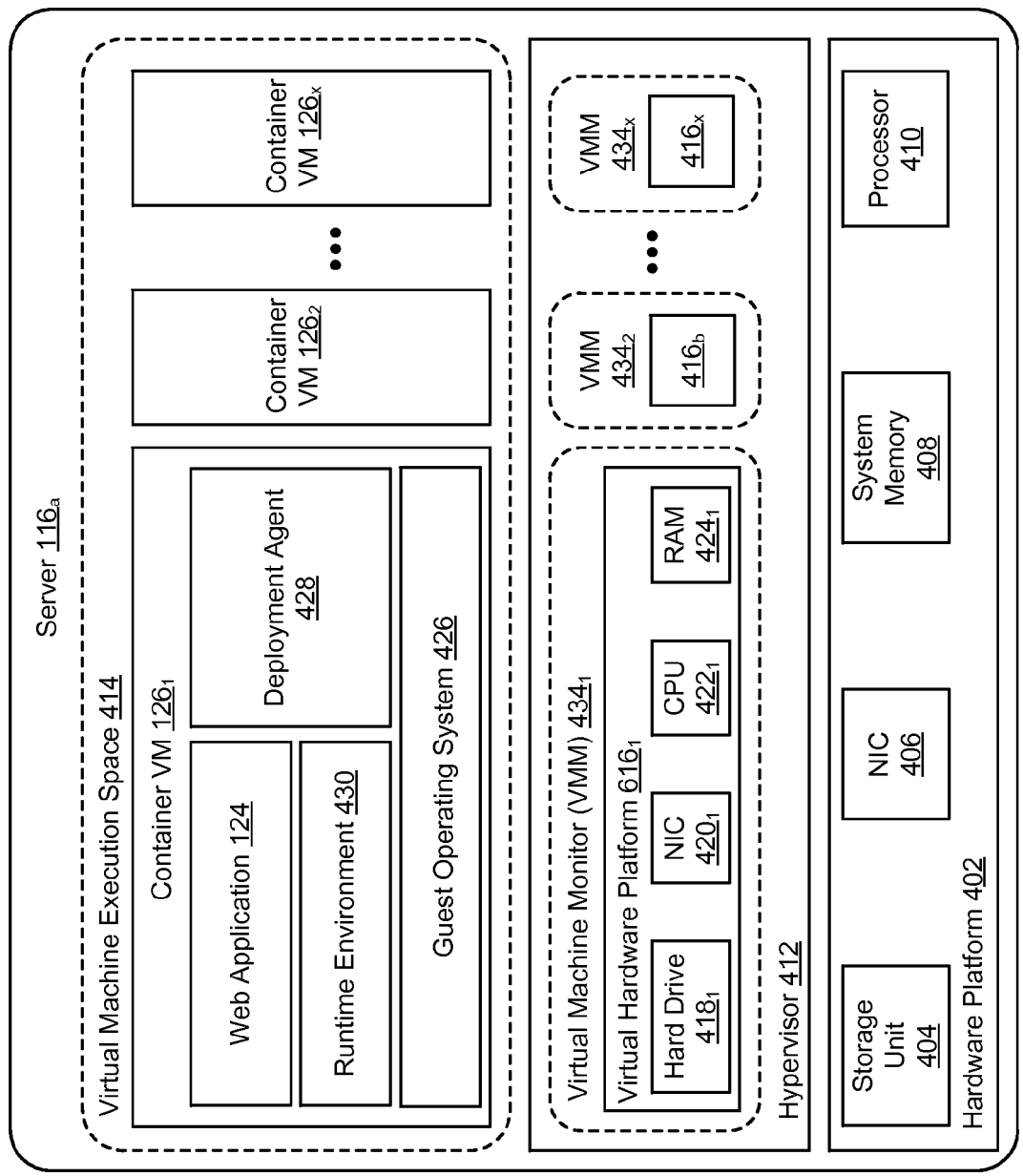
FIG. 4 depicts container virtual machines for hosting a web application in a cloud computing architecture.

FIG. 4 depicts container virtual machines for hosting a web application in a cloud computing architecture. Such container virtual machines are provided to a cloud computing architecture, for example, by virtualization platform 120, as previously discussed in the context of FIG. 1A. Container VM $126_1$ is hosted on one of servers $116_1$ to $116_n$ (e.g., server $116_1$ as depicted in FIG. 4) comprising a server grade hardware platform 402 such as an x86 architecture platform. Such a hardware platform may include a local storage unit 404, such as a hard drive, network adapter (NIC 406), system memory 408, processor 410 and other I/O devices such as, for example and without limitation, a mouse and keyboard (not shown in FIG. 4).

A virtualization software layer, also referred to hereinafter as hypervisor 412, is installed on top of hardware platform 402. Hypervisor 412 supports virtual machine execution space 414 within which multiple container VMs for hosting web applications may be concurrently instantiated and executed. As shown, virtual execution space 414 supports container VMs $126_1$ to $126_x$. For each of container VMs $126_1$ to $126_x$, hypervisor 412 manages a corresponding virtual hardware platform (i.e., virtual hardware platforms $416_1$-$416_x$) that includes emulated hardware such as virtual hard drive $418_1$, virtual NIC $420_1$, virtual CPU $422_1$ and RAM $424_1$ for VM $126_1$. For example, virtual hardware platform $416_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 426 to execute web application 125 for container VM $126_1$, although it should be recognized that, in alternative, embodiments, each of container VMs $126_1$ to $126_x$ may support the execution of multiple web applications rather than a single web application. Hypervisor 412 is responsible for transforming I/O requests from guest operating system 426 to virtual platform $416_1$ into corresponding requests to hardware platform 402. In the embodiment of FIG. 4, guest operating system 426 of container VM 126₁ supports the execution of a deployment agent 428, which is a process or daemon that communicates (e.g., via addressing and discovery layer 132) with cloud controller 134 to receive and unpack web application deployment packages, and with router 136 to provide network routing information for web applications that have been successfully deployed in container VM 126₁. Deployment agent 428 is automatically launched upon the instantiation of a container VM in certain embodiments. Guest operating system 426 further supports the installation and execution of runtime environment 430 within which web application 125 runs. For example, in one embodiment, runtime environment 430 may be a Java application server (e.g., Apache Tomcat, etc.) that includes a Java virtual machine and various API libraries that support the deployment of Java-based web applications. As described in the context of FIG. 3, such a runtime environment 430 may be received by a container VM as part of a web application deployment package created by cloud controller 134.

It should be recognized that the various terms, layers and categorizations used to describe the virtualization components in FIG. 4 may be referred to differently without departing from their functionality or the spirit or scope of the invention. For example, virtual hardware platforms 416₁-416ₓ may be considered to be part of virtual machine monitors (VMM) 434₁-434ₓ which implement the virtual system support needed to coordinate operations between hypervisor 412 and their respective container VMs. Alternatively, virtual hardware platforms 416₁-416ₓ may also be considered to be separate from VMMs 434₁-434ₓ, and VMMs 434₁-434ₓ may be considered to be separate from hypervisor 412. One example of hypervisor 412 that may be used is included as a component of VMware's ESX™ product, which is commercially available from VMware, Inc. It should further be recognized that other virtualized computer system architectures may be used consistent with the teachings herein, such as hosted virtual machine systems, where the hypervisor is designed to run on top of a host operating system. It should further be recognized, as previously discussed in the context of FIG. 1A, that virtualized platform 120 which provides container VMs, such as those in FIG. 4, may be supported by hardware resources 114 that comprise any number of physical computers and data storage systems in one or more data centers connected by networking, with each of the physical computers hosting one or more of container VMs 126₁ to 126ₘ, and possibly other VMs that run one or more processes carrying out the functions of other components of cloud computing environment 112, such as router 136, cloud controller 134, health manager 138, various base services 128, service provisioner 130, address and discovery layer 132 and the like. As discussed in the context of FIG. 4 with respect to container VMs, each VM supporting such other components is a virtual computer system that may have a guest operating system and one or more guest applications that can include any of the above processes.

Figure 5:
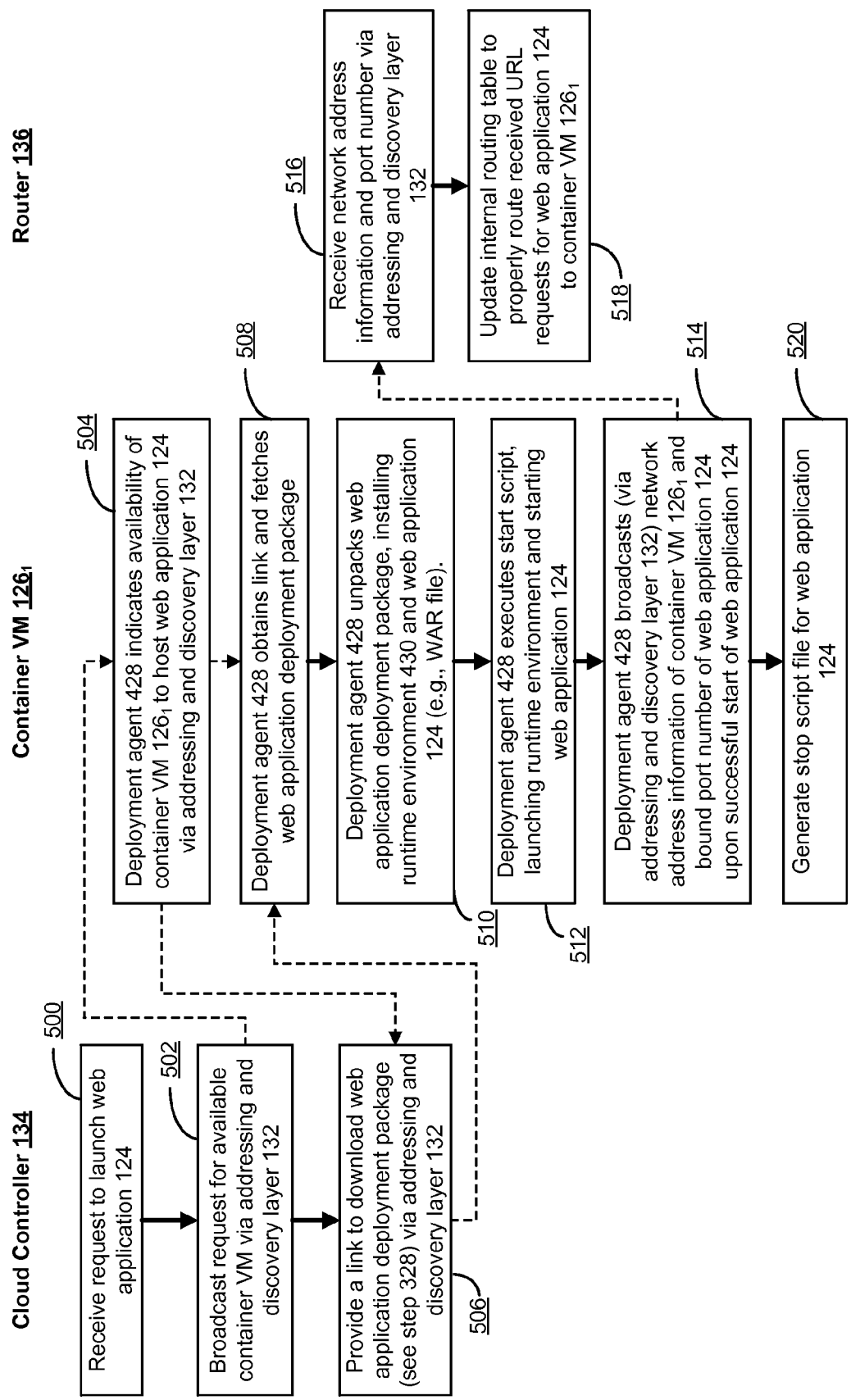
FIG. 5 depicts a flow diagram for deploying a web application in a container virtual machine.

FIG. 5 depicts a flow diagram for deploying a web application in a container virtual machine. The steps set forth in FIG. 5 take place, for example, after cloud controller 134 has received and prepared web application 125 for deployment in accordance with the steps set forth in FIG. 3. In step 500, cloud controller 134 receives a request from enterprise 100 (e.g., from developer 140) to launch web application 125. In step 502, cloud controller 134 broadcasts a request (via addressing and discovery layer 132) for an available container VM. In one embodiment, such a broadcast request may "flavored" by cloud controller 134 to request specific characteristics desired in a container VM, such as guest operating system type (e.g., Windows, Linux, MacOS, etc.), computing resource requirements (e.g., memory requirements, etc.) and the like. In step 504, deployment agent 428 of container VM 126₁ responds (via addressing and discovery layer 132) indicating the availability of container VM 126₁ to host web application 125. In step 506, cloud controller 134 (via addressing and discovery layer 132) provides deployment agent 428 a link (e.g., URL) or otherwise establishes a connection with container VM 126₁ to download a web application deployment package for web application 125 (e.g., as created in step 328 of FIG. 3), and in step 508, deployment agent 428 fetches or otherwise receives the web application deployment package. In step 510, deployment agent 428 unpacks the web application deployment package and installs runtime environment 430 (e.g., Apache Tomcat application server, etc), including loading the WAR file (or other package) associated web application 125 into the appropriate directory of the runtime environment. In step 512, deployment agent 428 executes the start script file of the web application deployment package thereby spawning a new process in container VM 126₁ that launches the runtime environment (e.g., Apache Tomcat) and starts web application 125 within the runtime environment.

In certain embodiments, base services 128 and/or third party services (such as custom database 104 and CRM service 106) are dynamically bound to web application 125 upon its launch in step 512 rather than during steps 322-324 of the staging process as previously described in the context of FIG. 3. In one such embodiment, cloud controller 134 may maintain globally accessible environment variables for available services in cloud computing environment 112. For any particular service, the values of such environment variables may provide service provisioning data such as the hostname, network address and port number or login credentials for the service. In one embodiment, such environment variables are initialized by cloud controller 134 during the staging process, for example, after step 320 of FIG. 3, when a service has been identified to cloud controller 134 to be used by web application 125 during its deployment. In such an embodiment, the staged web application 125 itself includes code (i.e., the web programmer knows to programmatically check the values of such environment variables or such code is otherwise injected into web application 125 during the staging process) that the searches for the names of environment variables for services that are utilized by web application 125 and binds web application 125 to those services using the values of such environment variables. As such, launch of web application 125 in step 512 causes such code in web application 125 to be executed, thereby dynamically binding the services to web application 125 upon its launch by utilizing the service provisioning data values of the environment variables.

Once deployment agent 428 recognizes that web application 125 has successfully launched (e.g., by confirming the successful binding of a port number to web application 125 in one embodiment), deployment agent 428 broadcasts the hostname, network address information of container VM 126₁ and the bound port number of deployed web application 125, in step 514, through addressing and discovery layer 132. In turn, router 136 retrieves the broadcast hostname, network address information and bound port number though the addressing and discovery layer 132 in step 516 and updates its internal routing table in step 518, thereby enabling router 136 to properly route URL requests received from enterprise customer 150 for web application 125 to container VM 126₁. It should be recognized that the process of dynamically updating routing information in router 136 upon successful deployment of a web application through steps 514 to 518 provides cloud computing environment 112 flexibility to more easily migrate, move or otherwise re-deploy web applications to different containers VM $126_1$ to $126_m$ for any of a number of reasons (e.g., during hardware failures, for load balancing purposes, etc.). For example, in one exemplary scenario, health manager 138 may recognize that web application 125 has stopped running because server $116_1$ that hosts container VM $126_1$ in which web application 125 has been deployed has suffered a hardware failure. Upon such recognition, health manager 138 may initiate a request to cloud controller 134 to re-deploy web application 125 in a different container VM running on a different server. Once web application 125 has been successfully re-deployed by cloud controller 134, as a result of steps 514 to 518, router 136 will be automatically updated with new routing information to properly route requests to web application 125 which is now deployed on a different container VM on a different server (and therefore is associated with new network routing information). It should be recognized that although the foregoing description utilizes hostnames, network addresses and port numbers to generally describe network address information for a web application, any type of network information may be utilized as network address information in embodiments, depending upon the structure of the connected network and communications protocols implemented by cloud computing environment 112. Additionally, in step 520, deployment agent 428 also identifies a process identifier for the deployed web application 125 and generates a stop script file, in the event that cloud controller 134 receives a command to stop web application 125 in the future (e.g., by request of administrator 146, etc.).

Figure 6:
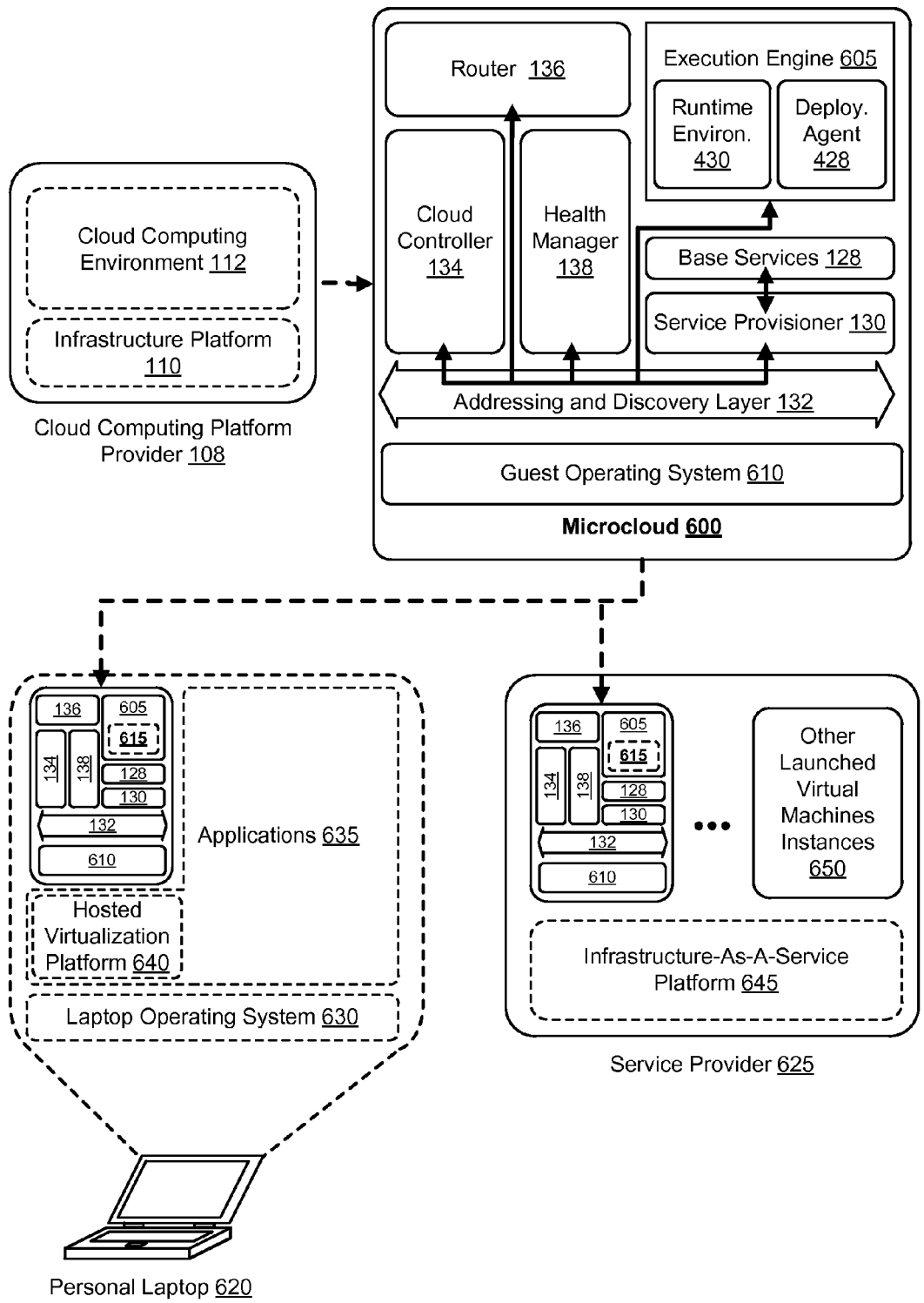
FIG. 6 depicts one embodiment of a microcloud platform delivery system.

FIG. 6 depicts one embodiment of a "microcloud" platform delivery system. As depicted, cloud computing platform provider 108 may provide a user (e.g., individual or business entity) the capability to download or otherwise obtain a "self-contained" virtual machine disk image 600 that includes the components of cloud computing environment 112 in FIG. 1 (hereinafter, such a virtual machine disk image may also be referred to as a "microcloud"). For example, microcloud 600 is a virtual machine disk image that includes installed versions of base services 128 (e.g., MySQL database server, etc.), service provisioner 130, address and discovery layer 132, cloud controller 134, router 136, and health manager 138. As further depicted in FIG. 6, microcloud 600 may also include an installed version of runtime environment 430 (e.g., Apache Tomcat application server, etc.) as well as a version of deployment engine 428, which together may be conceptually considered an execution engine 605 that serves a similar deployment environment function as a container VM $126_x$ that has been launched in a server $116_x$ of cloud computing platform provider 108 (as previously described in FIG. 4). When a user attaches microcloud 600 to a virtual machine and subsequently launches the virtual machine, the various components run as processes (rather than, for example, separate VMs as in other embodiments previously discussed) on top of guest operating system 610 (e.g., Linux, etc.) of the virtual machine thereby enabling the user to subsequently upload and deploy a web application 615 into execution engine 605 as similarly discussed in the context of FIG. 5 for container VMs.

As depicted in FIG. 6, such a downloadable microcloud 600 supports the deployment of web application 615 in a diversity of virtualization environments, ranging from an individual's personal laptop 620 to an infrastructure-as-a-service ("IaaS") service provider 625 (such as, e.g., Amazon's Elastic Cloud Compute web service). For example, the user may download microcloud 600 to personal laptop 620 (or any other personal computing device), which runs an operating system 630, such as Microsoft Windows, that provides the ability to run applications 635, including a hosted virtualization platform 640, such as VMware Workstation (or any other virtualization platform or virtual machine player that provides a capability to run a virtual machine). In such a personal computing environment, for example, downloaded microcloud 600 may be formatted as a .vmdk file (e.g., a virtual machine disk file format promulgated by VMware) or any other known virtual disk file format, such as the Open Virtualization Format (OVF).

Alternatively, microcloud 600 may be uploaded (e.g., by cloud computing platform provider 108 or the user himself, for example) to an IaaS service provider 625 that, for example, provides an IaaS platform 645 enabling users to dynamically launch (and stop) virtual machine instances 650 in a manner that supports the users' particular business needs. For example, a user can log into IaaS platform 645, allocate himself a virtual machine instance (e.g., with a selected guest operating system), and upload, configure and install desired applications, libraries and data accordingly (for example, to launch a web application, etc.). As depicted in FIG. 6, IaaS platform 645 may further provide the capability to upload and attach a preconfigured virtual machine disk image, such as microcloud 600, to an allocated virtual machine. Once a user uploads and attaches microcloud 600 to a launched virtual machine instance in IaaS 645, the various processes running on top of guest operating system 610 in the virtual machine instance (e.g., base services 128, service provisioner 130, address and discovery layer 132, cloud controller 134, router 136, and health manager 138, runtime environment 430, deployment engine 428, etc.) provide a web application deployment environment that enables a user to upload a web application deployment package to cloud controller 134 running in the virtual machine instance for eventual unpacking into runtime environment 430 and deployment by deployment agent 426 of execution engine 605 (as described in the context of FIG. 5). In one embodiment, for example, IaaS service provider 625 may be Amazon.com and IaaS platform 645 may be Amazon's Elastic Compute Cloud (EC2) web service. In such an embodiment, microcloud 600 may be formatted as an Amazon Machine Image (AMI) and uploaded and persisted to Amazon's Elastic Block Service (EBS) storage system. A user can then log into EC2 to launch a virtual machine instance that accesses the AMI version of microcloud 600 that is stored in EBS in order to provide a cloud computing environment in a self-contained virtual machine to deploy web applications.

It should be recognized that the microcloud platform delivery system of FIG. 6 is merely exemplary and that alternative embodiments may have various modifications and changes. For example, in one alternative embodiment, rather than uploading microcloud 600, cloud computing platform provider 108 may communicate with IaaS service provider 625 to request the provisioning and launching of a virtual machine instance with a default virtual disk image within IaaS platform 645 (for example, containing a guest operating system such as Linux). As part of the provisioning process of the virtual machine instance, cloud computing platform provider 108 may upload a shell script (or any other type of script executable by the default operating system) in to the virtual machine instance that executes upon an initial booting of the virtual machine instance. During its execution, the shell script instructs the guest operating system to download, configure and install cloud computing environment components such as base services 128, service provisioner 130, address and discovery layer 132, cloud controller 134, router 136, and health manager 138, runtime environment 430, and deployment engine 428, thereby composing microcloud 600 during an initial boot process of the provisioned virtual machine image. For example, in one embodiment, the shell script contains certain URLs corresponding to the components (and any additional data and configuration information) such that the components may be downloaded, for example, from a "blob-store" (binary large object store) or are otherwise available at cloud computing platform provider 108 or at any other networked location designated by the shell script. In yet another embodiment, a user can provide a more scalable cloud computing environment by launching multiple virtual machine instances of microcloud 600. In such an embodiment, the user may designate one virtual machine instance as a primary instance and configure each of the other cloud computing environment components (e.g., cloud controller, base services, runtime environment 430, etc.) running on other "helper" virtual machine instances of microcloud 600 to communicate using address and discovery layer 132 of the primary instance. The user may further configure the cloud computing environment components of the helper virtual machine by turning certain components off or on to increase performance of the helper virtual machines.

It should be recognized that various modifications and changes may be made to the specific embodiments described herein without departing from the broader spirit and scope of the invention as set forth in the appended claims. For example, while the foregoing description has discussed embodiments using web applications or Internet applications, it should be recognized that any network utilizing application can leverage the techniques disclosed herein, and as such, "web application" as used herein shall be interpreted to include any type of client-server based application that employs network based communications. Furthermore, although the foregoing embodiments have focused on the use of container VMs to host deployed web applications, it should be recognized that any "application container" may be used to host web applications, including such container VMs, processes in virtual machines, kernel level containers, processes in traditional non-virtualized operating systems and any other execution environment that provides an isolated environment capable of running application level code. Similarly, while the various components of cloud computing environment 112 have been generally described as being implemented in one or more virtual machines (e.g., for load balancing and scalability purposes), it should be recognized that any type of "application container" (as previously discussed above) can also implement such components, including, for example, traditional non-virtualized computing environment background processes, threads or daemons. Furthermore, any combination of different types of "application containers" to host web applications and implement other components (e.g., cloud controller 134, router 136, health manager 138, base services 128, service provisioner 130, addressing and discovery layer 132, etc.) can comprise any particular cloud computing environment 112 implementation. It should further be recognized that multiple instances of the various components of cloud computing environment 112 (e.g., cloud controller 134, router 136, health monitor 138, service provisioner 130, etc.) may be implemented in alternative embodiments, for example, for scalability purposes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for delivering a cloud computing environment for deploying a web application, wherein the cloud computing environment is configured to launch in a virtualization environment, the method comprising the steps of:

receiving a request for the cloud computing environment;

composing a virtual machine disk image comprising (i) at least one installed server providing a service accessible to the web application, (ii) a runtime environment configured to deploy the web application, (iii) a controller component configured to receive the web application, bind the service to the web application and package the web application into a deployment package; (iv) a deployment agent component configured to receive the deployment package from the controller component and deploy the web application into the runtime environment, (v) a router component configured to route web application requests to the runtime environment, and (vi) an address and discovery layer component configured to propagate messages among the server, runtime environment, controller component, deployment agent component and router component; and providing the virtual machine disk image in response to the request.

2. The method of claim 1, wherein the virtual machine disk image further comprises a guest operating system.

3. The method of claim 2, wherein the virtual machine disk image further comprises a health manager component configured to monitor a status of the web application.

4. The method of claim 2, wherein, upon, attaching the virtual machine disk image to a launched virtual machine, the server, runtime environment, controller component, deployment agent component, router component and address and discovery layer component are configured to run as processes on top of the guest operating system in order to support receipt and deployment of the web application in the launched virtual machine.

5. The method of claim 1, wherein providing the virtual machine disk image in response to the request further comprises uploading the virtual machine disk image to an infrastructure-as-a-service service provider configured to launch virtual machine instances upon request.

6. The method of claim 1, wherein providing the virtual machine disk image in response to the request further comprises downloading the virtual machine disk image to a personal computing device for attachment to a virtual machine running in the personal computing device.

7. The method of claim 1, wherein providing the virtual machine disk image in response to the request comprises requesting a provisioning of a virtual machine instance at an infrastructure-as-a-service service provider and the composing occurs by providing the provisioned virtual machine instance a shell script comprising instructions to download the server, runtime environment, controller component, deployment agent component, router component and address and discovery layer component from a networked location to the virtual machine disk image.

8. A non-transitory computer-readable storage medium including instructions that, when executed on a computer processor, causes the computer processor to deliver a cloud computing environment for deploying a web application, wherein the cloud computing environment is configured to launch in a virtualization environment, by performing the steps of:

receiving a request for the cloud computing environment;

composing a virtual machine disk image comprising (i) at least one installed server providing a service accessible to the web application, (ii) a runtime environment configured to deploy the web application, (iii) a controller component configured to receive the web application, bind the service to the web application and package the web application into a deployment package; (iv) a deployment agent component configured to receive the deployment package from the controller component and deploy the web application into the runtime environment, (v) a router component configured to route web application requests to the runtime environment, and (vi) an address and discovery layer component configured to propagate messages among the server, runtime environment, controller component, deployment agent component and router component; and providing the virtual machine disk image in response to the request.

9. The non-transitory computer-readable storage medium of claim 8, wherein the virtual machine disk image further comprises a guest operating system.

10. The non-transitory computer-readable storage medium of claim 9, wherein the virtual machine disk image further comprises a health manager component configured to monitor a status of the web application.

11. The non-transitory computer-readable storage medium of claim 9, wherein, upon, attaching the virtual machine disk image to a launched virtual machine, the server, runtime environment, controller component, deployment agent component, router component and address and discovery layer component are configured to run as processes on top of the guest operating system in order to support receipt and deployment of the web application in the launched virtual machine.

12. The non-transitory computer-readable storage medium of claim 8, wherein the providing step further comprises uploading the virtual machine disk image to an infrastructure-as-a-service service provider configured to launch virtual machine instances upon request.

13. The non-transitory computer-readable storage medium of claim 8, wherein the providing step further comprises downloading the virtual machine disk image to a personal computing device for attachment to a virtual machine running in the personal computing device.

14. The non-transitory computer-readable storage medium of claim 8, wherein the providing step comprises requesting a provisioning of a virtual machine instance at an infrastructure-as-a-service service provider and the composing step occurs by providing the provisioned virtual machine instance a shell script comprising instructions to download the server, runtime environment, controller component, deployment agent component, router component and address and discovery layer component from a networked location to the virtual machine disk image.

15. A server configured to deliver a cloud computing environment for deploying a web application, wherein the cloud computing environment is configured to launch in a virtualization environment, the server comprising a processor configured to perform the steps of:

receiving a request for the cloud computing environment;

composing a virtual machine disk image comprising (i) at least one installed server providing a service accessible to the web application, (ii) a runtime environment configured to deploy the web application, (iii) a controller component configured to receive the web application, bind the service to the web application and package the web application into a deployment package; (iv) a deployment agent component configured to receive the deployment package from the controller component and deploy the web application into the runtime environment, (v) a router component configured to route web application requests to the runtime environment, and (vi) an address and discovery layer component configured to propagate messages among the server, runtime environment, controller component, deployment agent component and router component; and providing the virtual machine disk image in response to the request.

16. The server of claim 15, wherein the virtual machine disk image further comprises a guest operating system.

17. The server of claim 16, wherein, upon, attaching the virtual machine disk image to a launched virtual machine, the server, runtime environment, controller component, deployment agent component, router component and address and discovery layer component are configured to run as processes on top of the guest operating system in order to support receipt and deployment of the web application in the launched virtual machine.

18. The server of claim 15, wherein the providing step further comprises uploading the virtual machine disk image to an infrastructure-as-a-service service provider configured to launch virtual machine instances upon request.

19. The server of claim 15, wherein the providing step further comprises downloading the virtual machine disk image to a personal computing device for attachment to a virtual machine running in the personal computing device.

20. The server of claim 15, wherein the providing step comprises requesting a provisioning of a virtual machine instance at an infrastructure-as-a-service service provider and the composing step occurs by providing the provisioned virtual machine instance a shell script comprising instructions to download the server, runtime environment, controller component, deployment agent component, router component and address and discovery layer component from a networked location to the virtual machine disk image.

\* \* \* \* \*